United States Patent [19]

Nishihara et al.

[11] Patent Number: 5,394,408
[45] Date of Patent: Feb. 28, 1995

[54] POLICING CONTROL APPARATUS

[75] Inventors: Motoo Nishihara; Takatoshi Kurano; Naoaki Yamanaka, all of Tokyo; Youichi Sato, Kanagawa, all of Japan

[73] Assignees: NEC Corporation; Nippon Telegraph and Telephone Corporation, both of Tokyo, Japan

[21] Appl. No.: 15,343

[22] Filed: Feb. 8, 1993

[30] Foreign Application Priority Data

Feb. 10, 1992 [JP] Japan .................. 4-024016

[51] Int. Cl.6 .................. G06F 11/00; H03M 13/00
[52] U.S. Cl. .................. 371/57.2; 370/14; 370/94.1
[58] Field of Search .................. 371/57.2, 57.1, 48, 371/72, 47.1; 395/575, 775, 800, 375, 425; 364/228.3, 228.1, 232.1, 244.3, 262.4; 370/14, 54, 60, 94.1

[56] References Cited

U.S. PATENT DOCUMENTS

| 4,749,871 | 6/1988 | Galvin et al. | 340/630 |
| 5,091,903 | 2/1992 | Schrodi | 370/58.1 |
| 5,140,588 | 8/1992 | Danner | 370/94.1 |
| 5,210,744 | 5/1993 | Yamanaka et al. | 370/60 |
| 5,253,247 | 10/1993 | Hirose et al. | 370/14 |
| 5,274,680 | 12/1993 | Sorton et al. | 375/118 |
| 5,287,530 | 2/1994 | Davis et al. | 370/94.1 |

Primary Examiner—Robert W. Beausoliel, Jr.
Assistant Examiner—Dieu-Minh Le
Attorney, Agent, or Firm—Ostrolenk, Faber, Gerb & Soffen

[57] ABSTRACT

A policing control apparatus having a cell input terminal receiving asynchronous transmission communication network cells; a policing circuit coupled to the input terminal for policing transmission of cells according to policing information; a cell output terminal from the policing circuit for outputting policed cells; a count memory in the policing circuit for storing a count value of the cells supplied to the policing circuit and for supplying the count value as the policing information; and a self-diagnosing circuit for monitoring problems and abnormalities of stored contents in the count memory and outputting an alarm upon detection of a problem or abnormality.

4 Claims, 3 Drawing Sheets

POLICING CONTROL APPARATUS

BACKGROUND OF THE INVENTION

The present invention relates generally to ATM (Asynchronous Transfer Mode) communication networks and, more specifically, to a policing control apparatus for ATM communication networks.

ATM communications have been proposed to realize multiple media communications, high rate, broadband communications and other advanced and diversified communications. ATM communication networks handle traffic with various communication rates (i.e., rate characteristics) and time variations of the transmission data quantity (i.e., burst characteristics). In the light of traffic having such diversified characteristics, there is a demand for efficiently and economically managing channel bands (i.e., network resources) while maintaining required cell delay time sway and cell discarding factor (i.e., service quality). To meet this demand, traffic control techniques are important.

In the traffic control technology, in order to allow common use of network resources by multiple media communications, satisfy the service quality for each call and realize high rate cell transmission, traffic control for regulating the input to the network from the consideration of the accepting status of the network, is made without making cell transmission level flow control. As one type of traffic control, a policing control is used, which monitors the user's traffic status during the communication on the basis of a user's traffic declaration. More specifically, in a policing control, the transmitted cells are monitored, and those violating contract requirements or rules are regulated at the gate of the network.

In the ATM communication network, continuous transmission of a great number of cells to the network from a particular user interferes with fair utilization of the network. Besides, it is liable to disable smooth switching and transfer control within the network. Accordingly, the user is required to make a contract such that the user can effect transmission of a number of cells less than a predetermined limit in a predetermined time (i.e., cell time) for each virtual path identifier (VPI), which is set from the prescriptions for each terminal user or subscriber but that excess cells transmitted are discarded. The cell time and the permissible transmission cell number are usually set for each service class. The policing is an operation of monitoring the status of cell transmission at the network gate and discarding cells that are transmitted by violating the contract.

FIG. 3 shows a conventional policing circuit. When a cell is inputted to a cell input terminal, its VPI No. is supplied to a service class No. memory 1 and a data memory 2. The data memory 2 is, for example, of a logical multiplex FIFO type constructed as a single port memory and stores data at each designated address. In the service class No. memory 1 are stored service class No. information corresponding to VPI No. information. When the VPI No. of a cell is inputted to the memory 1 from the cell input terminal, a corresponding service class No. is read out and outputted. A write address generator 3 generates an address which is incremented by "1" in one cell time in response to a cell pulse clock, not shown, the generated address being supplied as a write address to a selector 4.

An upper limit value memory 9 has a storage of upper limit values of cell numbers for respective service classes corresponding to service class No. information in policing cycles. In response to a service class No. from the service class No. memory 1, a predetermined cell number upper limit value for the corresponding service class in a policing cycle is outputted from the upper limit value memory 9. The VPI No., service class No., etc. from the cell input terminal, are written in areas at the addresses designated by address information, which is output from the write address generator 3 and supplied through a selector 4 to an address terminal of the data memory 2. A counter 5 counts (n+1) (n being the number of service classes) times cell pulses, not shown, as clock and outputs all service class Nos. in one cell time. In an address No. memory 6 are stored specific values as policing cycles of individual service classes. These values are read out sequentially in every cell time under the control of the output of the counter 5, thus providing the policing cycles of all the service classes. A subtractor 7 subtracts the address No. value output of the address No. memory 6 from the write address output of the write address generator 3 and supplies the difference as a read address to the selector 4.

The writing of the VPI No. and service class No. in the data memory 2 is made in the write addresses designated by the address information supplied through the selector 4. In one cell time, the writing is made once, while the reading is made a number of times corresponding to the number of service classes. Data including VPI Nos. and service class Nos. stored in the area at addresses designated by the information fed to the address terminal of the data memory 2, is read out from the data memory 2. The selector 4 switches the addresses in write and read times in one cell time. A logic processing unit 8 controls the operation of a count memory 10 and a cell regulation unit 11 according to upper limit values from the upper limit value memory 9, the VPI No. from the cell input terminal, count value from the counter 5 corresponding to service class No., VPI No. and service class No. from the data memory 2 and VPI from the cell input terminal.

In the count memory 10 is stored count values of cells identified by VPI Nos. Whenever the VPI value is read out from the data memory 2, the logic processing unit 8 decrements the count value of the pertinent VPI cells in the count memory 10. Also, whenever a VPI value is written in the data memory 2, the logic processing unit 8 increments the pertinent VPI cell count value in the count memory 10. For the count memory 10 used are the VPIs as the address information and the count values as the data, and the incrementing and decrementing is controlled by reading out the pertinent VPI cell in the count memory 10, the count value being stored again in the count memory 10. When writing in the data memory 2 is made and the count value in the count memory 10 is incremented, the upper limit value for the pertinent VPI is read out, and the incremented count value and the read-out upper limit value are compared in the logic processing unit 8.

If the incremented count value exceeds the upper limit value of the upper limit value memory 9, the logic processing unit 8 determines the pertinent input cell is one which is violating the contract. Thus, regulation of the cells such as discarding thereof is realized by outputting a discarding signal to the cell regulation unit 11.

In the above policing circuit, if the stored cell count value data are destroyed due to a problem or tentative abnormal operation in the count memory 10 storing the count values corresponding to the VPI service classes or in an access circuit for the count memory circuit 10, the abnormality can not be detected. Unless it is possible to detect and cope with generated abnormality in the event of destruction of the content of the count memory, that abnormality of policing due to the count memory content destruction remains permanently. That is, policing processing based on the abnormal count values will be executed and lead to the discarding of even proper cells, thus extremely spoiling service quality.

SUMMARY OF THE INVENTION

An object of the invention is therefore to provide a policing control apparatus, in which the state of the count memory is self-monitored to generate an alarm in the event of occurrence of abnormality.

Another object of the invention is to provide a policing control apparatus, which has a simplified construction and is obtainable with a minimum change in the constitution of the existing policing circuit.

According to the present invention, there is provided a policing control apparatus comprising, a cell input terminal for receiving asynchronous transmission communication network cells, a policing circuit for policing the traffic of cells from the cell input terminal according to policing information, a cell output terminal for outputting cells having been policed in the policing circuit, a count memory for storing the count values of the cells supplied to the policing circuit and supplying the count value as the policing information to the policing circuit, and a self-diagnosing circuit for checking any trouble in the count memory and also for any abnormality of the stored content in the count memory and outputting an alarm in the event of detection of a problem or any abnormality.

Other objects and features will be clarified from the following description with reference to the attached drawings.

DETAILED DESCRIPTION OF PREFERRED EMBODIMENTS

Now, an embodiment of the present invention will be described with reference to the drawings.

Figure 1:
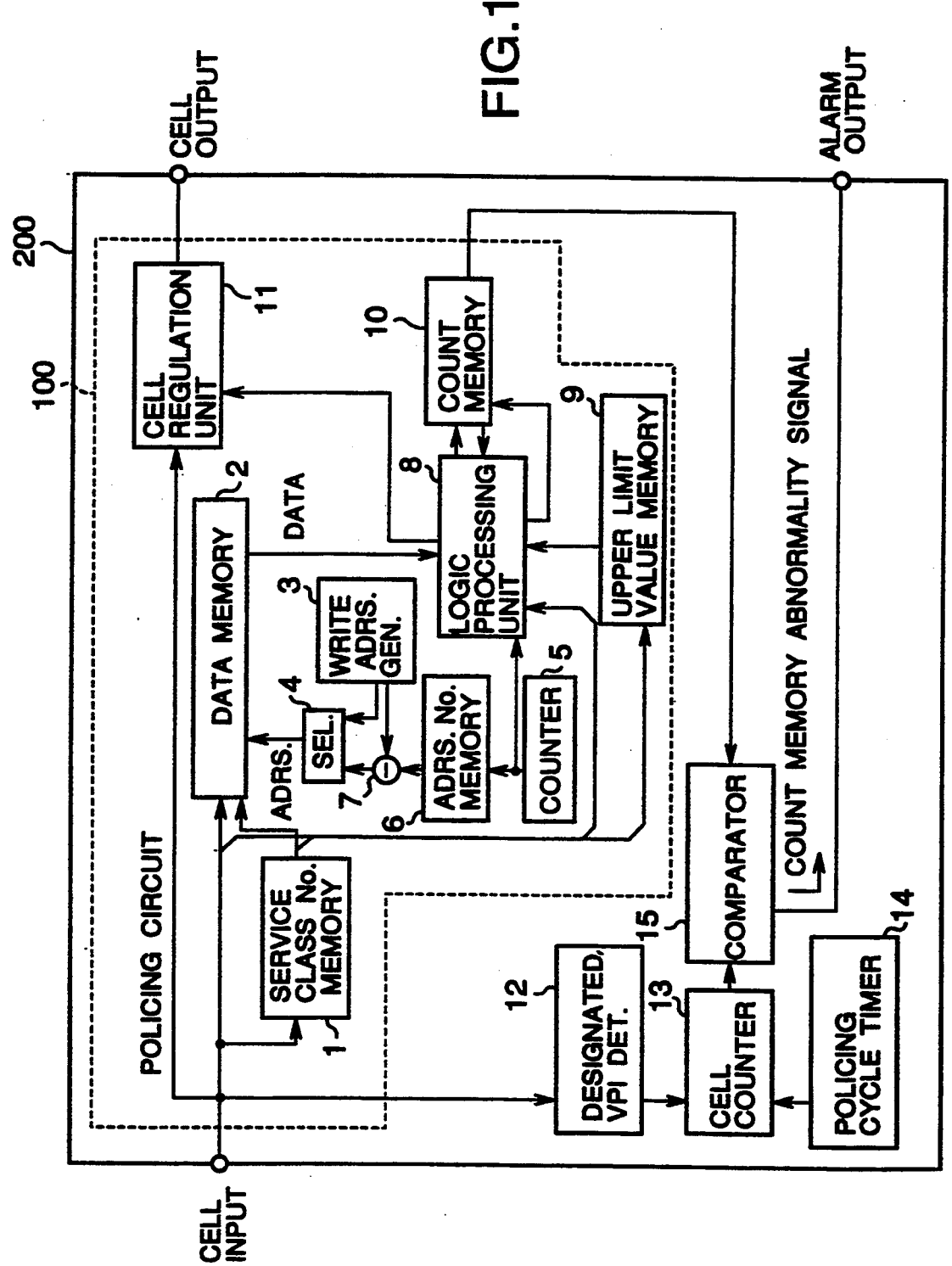
FIG. 1 is a block diagram showing an embodiment of the policing control apparatus according to the invention.
Figure 2:
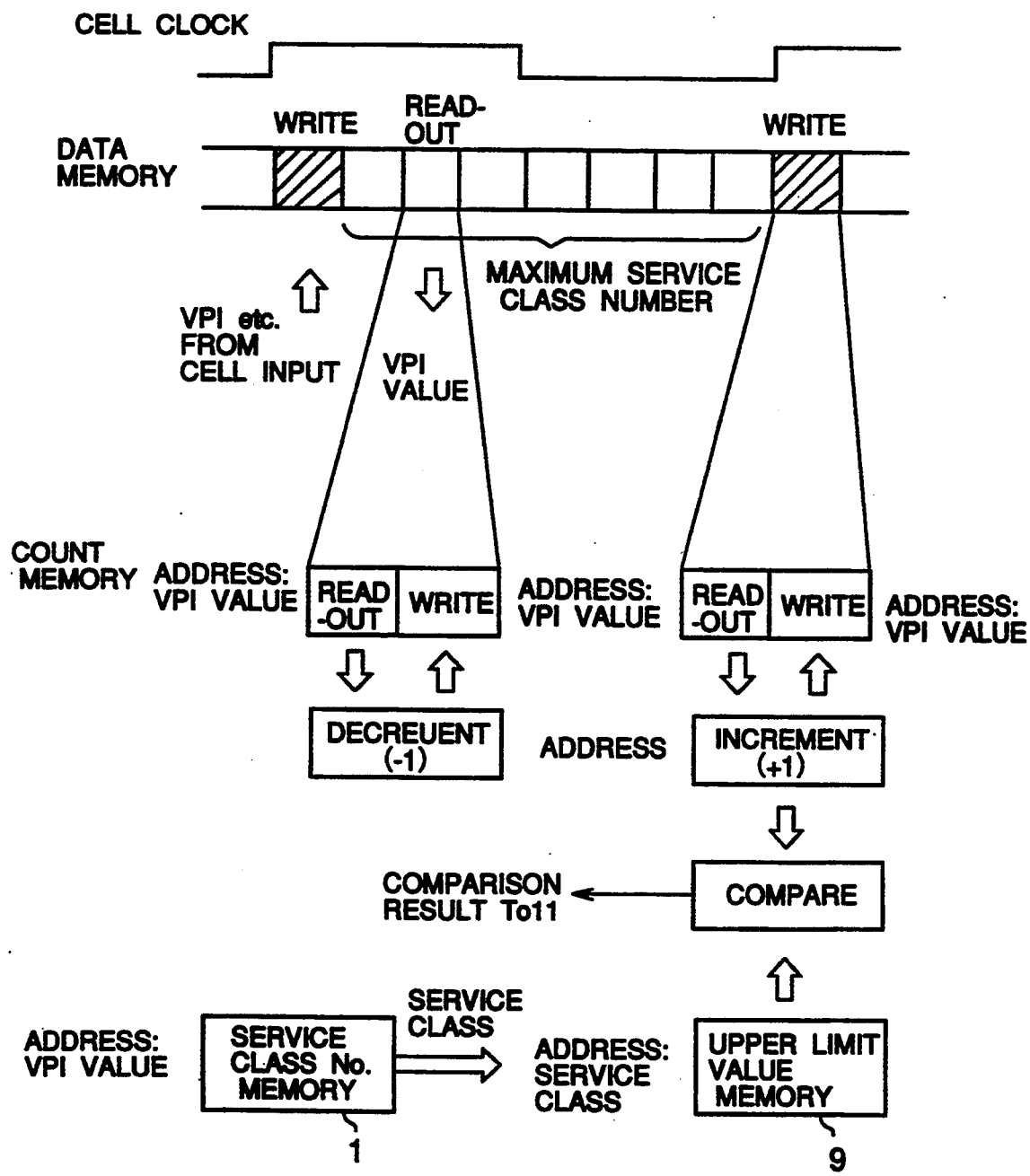
FIG. 2 is timing diagram explaining the operation of the embodiment shown in FIG. 1.
Figure 3:
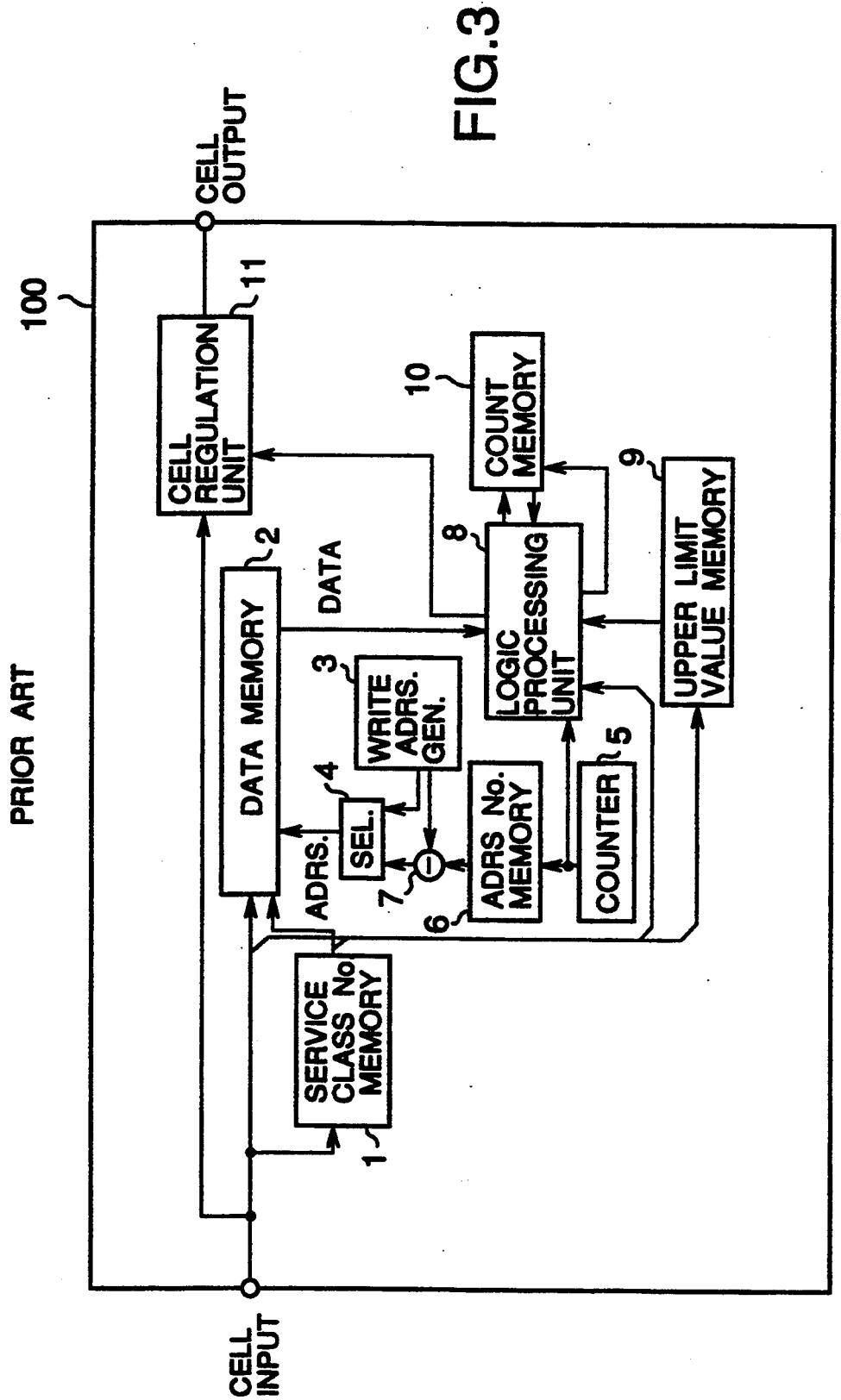
FIG. 3 is a block diagram showing a prior art policing circuit.

FIG. 1 is a block diagram showing an embodiment of the policing arrangement according to the present invention, and FIG. 2 is a drawing explaining the operation of the embodiment.

Referring to the FIGS. 1 and 2, the embodiment of the invention comprises a policing circuit 100 and an asynchronous transfer mode network policing controller 200. The policing circuit 100 monitors and polices the traffic of packet communication cells inputted to a cell input terminal. The policing controller 200 has a cell output terminal, from which cells having been policing controlled are outputted, and it includes self-diagnosis means for detecting problems in the count memory 10 in the policing circuit 100 and also abnormality of the contents stored in the count memory 10.

Specifically, the self-diagnosis means includes a designated VPI detector 12, a policing cycle timer 14, a cell counter 13, and a comparator 15. The designated VP detector 12 detects a designated specific VPI No. The policing cycle timer 14 determines the cycle time of policing for the service class corresponding to the designated VPI. The cell counter 13 counts the arrived cells of the designated VPI. The comparator 15 compares the content of the count memory 10 in the policing circuit 100 and the output of the cell counter 13. If the two outputs compared are not identical, it judges that abnormality has been occurred in the count memory 10 and an access circuit therefor, etc., and generates an alarm signal.

When a cell of the designated VPI No. is inputted, the designated VPI detector 12 notifies the cell counter 13 of the input cell of the designated VPI No. Whenever it is notified, the cell counter 13 increments its cell count value by "1", thus effecting the counting of designated cells arrived since the start of the operation. The policing cycle timer 14 increases the count value from "0" until the policing cycle time for the service class of the designated VPI, and at the instant when the count value reaches the policing cycle time, it notifies the cell counter 13 of the lapse of the policing cycle time.

Upon the notification of the lapse of the policing cycle time by the policing cycle timer 14, the cell counter 13 notifies the comparator 15 of the prevailing cell count information. The comparator 15 compares the content of the count memory 10 in the policing circuit 100 and the cell count value information from the cell counter 13. If these two inputs are identical, the comparator 15 judges that the content of the counter memory 10 for the designated VPI is normal. If the two inputs are not identical, it judges that the content of the counter memory 10 with respect to the designated VPI is abnormal, and it outputs a count memory abnormality signal to an alarm output terminal.

The comparator 15 has to receive the cell count value for the designated VPI. However, it is only the logic processing unit 8 in the policing circuit that can access the count memory 10. That is, as means of the comparator 15 in this embodiment, for accessing the count memory 10, the logic processing unit 8 accesses the count memory 10 upon arrival of a designated VPI cell so that the cell count value information is received at the instant of input of the same information. This arrangement, however, is not limiting, and the following alternative arrangement is conceivable.

That is, the logic processing unit 8 is allowed to access the count memory 10 when and only when an effective VPI value is read out from the data memory 2, and otherwise, i.e., while the counter memory 10 is not accessed, the reading is permitted. As a further alternative, the number of times of accesses to the count memory 10 during one cell time is Increased by one for preparing the extra access cycle of obtaining the count for the comparator.

The latter arrangement is possible if there is redundant time for accessing the count memory 10. If there is no redundancy or if the arrangement of the policing circuit is not changed, it is suitable to adopt the arrangement in the embodiment or the former arrangement.

In the meantime, when the cell count value from the count memory 10 reaches the upper limit value stored in the upper limit value memory 9, it is liable that a proper input cell is discharged as being a violating cell by the policing function. In such a case, the count memory 10 is not caused to up-count while the cell counter 13 is caused to up-count. Therefore, the identity of the outputs of the count memory 10 and cell counter 13 is lost even without any abnormality in the memory counter 10. In this case, it is judged that a problem exists, and the comparator 15 outputs the abnormality signal. To cope with this, in this embodiment the trouble diagnosis is made when and only when the count value of the count memory 10 is smaller than the upper limit value. However, it is possible to adopt other arrangements to the above end.

In one of such alternative arrangements, violating cells for the designated VPI are counted separately, and this count value is added to the content of the count memory 10, the sum being compared with the output of the cell counter 13. As another alternative, the up-counting operation of the cell counter 13 is stopped upon reception of a signal indicative of the detection of a violating cell. The violating cell count is reset after the end of the policing cycle time.

In the above description, the various functions have been shown to be implemented by hardware. It is possible to realize these functions with a single or a few hardware elements by forming a programmed control unit in a single memory. Further, it is readily conceivable to provide arrangements such that, upon occurrence of the failure of identity, the count value of the count memory for the pertinent VPI, will begin self-repair.

As has been described in the foregoing, according to the invention the operation of the count memory in the policing circuit is self-diagnosed, and it is possible to detect, with a simple construction, any abnormality of the cell count information of the count memory that may bring about permanent abnormality of the policing circuit.

What is claimed is:

1. A policing control apparatus comprising:
    a cell input terminal for receiving asynchronous transmission communication network cells;
    a policing circuit coupled to said input terminal for policing transmission of cells from said cell input terminal according to policing information;
    a cell output terminal provided as an output of said policing circuit for outputting cells policed in said policing circuit;
    a count memory in said policing circuit for storing a count value of the cells supplied to said policing circuit and for supplying said count value as said policing information; and
    a self-diagnosing circuit for monitoring problems in said count memory and abnormalities of stored contents in said count memory and outputting an alarm upon detection of a problem or abnormality;
    said self-diagnosing circuit including a first circuit for detecting a designated specific virtual path identifier (VPI), a timer for determining a policing cycle time for a service class identified by said designated specific VPI, a second circuit coupled to said first circuit for counting arriving cells identified by said designated specific VPI, and a third circuit coupled to an output of said second circuit for comparing contents of the count memory in said policing circuit and the output of said second circuit and for generating said alarm upon failure of identity of the output of the second circuit and the contents of the count memory.

2. The policing arrangement according to claim 1, wherein said self-diagnosis is performed when and only when the count value of said count memory is not greater than a predetermined threshold value.

3. The policing control apparatus according to claim 1, wherein a sum value of an exceeded count value and the count value of said count memory is compared in said third circuit with a number of arrived cells identified by said specific VPI when the count value of said count memory exceeds a predetermined value.

4. The policing control apparatus according to claim 1, wherein, upon exceeding of a predetermined value of the count value of said count memory, a violation signal is generated by said third circuit to stop a counting operation of said second circuit.

* * * * *